Patented Aug. 16, 1949

2,478,910

UNITED STATES PATENT OFFICE 2,478,910

PROCESS OF RECOVERING 2-CARBOXY-1,2'-DIANTHRIMIDE

Maurice H. Fleysher, Buffalo, N. Y., assignor to Allied Chemical & Dye Corporation, New York, N. Y., a corporation of New York No Drawing. Application December 24, 1946, Serial No. 718,275

9 Claims. (Cl. 260—368)

This invention relates to the manufacture of 2 - carboxy - 1,2' - dianthrimide (2-carboxy-1,2'-dianthraquinonylamine) and more particularly to improvements in the process of recovering 2-carboxy-1,2'-dianthrimide from mixtures containing it together with insoluble impurities. It relates especially to improvements in the recovery of 2-carboxy-1,2'-dianthrimide from the crude reaction product resulting from the condensation of 1 - chloro - 2 - carboxy - anthraquinone with 2-amino-anthraquinone.

It is known to manufacture 2-carboxy-1,2'-dianthrimide by the condensation of 2-amino-anthraquinone with 1-chloro-2-carboxy-anthraquinone (or 2 - chloro - anthraquinone with 1-amino-2-carboxy-anthraquinone). The condensation is usually carried out with the aid of an acid-binding agent (for example, sodium acetate, sodium carbonate, calcium oxide, magnesium carbonate, calcium acetate, etc.), in the presence or absence—see German Patent 279,867 to Badische—of a copper catalyst (for example, copper, cuprous chloride, copper oxide, copper carbonate, etc.), and generally in an inert organic solvent or diluent (for example, dichlorobenzene, trichlorobenzene, nitrobenzene, naphthalene, etc.). In copending application Serial No. 718,276 filed December, 24, 1946, of Richard S. Wilder, a process is disclosed wherein the condensation is carried out with the aid of a Friedel and Crafts condensing agent, and especially aluminum chloride.

Heretofore, after completion of the condensation, the 2-carboxy-1,2'-dianthrimide has been recovered from the condensation reaction mixture by filtration, and purified by washing with various solvents. For example, according to German Patent 268,219 to Badische Anilin, the condensation reaction mixture is diluted with solvent naphtha and filtered, and the filter-cake is washed first with solvent naphtha, then with alcohol, then with dilute hydrochloric acid, and finally with water. It has also been proposed to recover the 2-carboxy-1,2'-dianthrimide from the condensation reaction mixture by boiling with aqueous sodium carbonate, to form the sodium salt of the carboxy-dianthrimide; filtering the resulting solution to remove insoluble impurities, such as by-products formed in the reaction, residual 2-amino-anthraquinone (or 2-chloro-anthraquinone), catalyst sludge, etc.; acidifying the resulting solution to precipitate the carboxy-dianthrimide; filtering off the precipitate; and washing the filter-cake with water. When an inert solvent or diluent has been used in the condensation, it has also been proposed to remove the solvent or diluent from the condensation reaction mixture by steam distillation, followed by recovery of the 2-carboxy-1,2'-dianthrimide from the remaining condensation product.

The yields of 2-carboxy-1,2'-dianthrimide thus obtained are low, or its quality is inferior as shown by the low yield of 1,2,5,6-diphthaloyl-acridone obtained from it.

An object of the present invention is to provide an improved process for the recovery of 2-carboxy-1,2'-dianthrimide from mixtures containing it together with insoluble impurities whereby an increased yield of 2-carboxy-1,2'-dianthrimide is obtained.

Another object of the present invention is to provide an improved process for the recovery of 2-carboxy-1,2'-dianthrimide from mixtures containing it together with insoluble impurities whereby 2-carboxy-1,2'-dianthrimide of improved quality is obtained.

An additional object of the present invention is to provide an improved process for the recovery of 2-carboxy-1,2'-dianthrimide from a crude reaction product resulting from the condensation of 2-amino-anthraquinone with 1-chloro-2-carboxy-anthraquinone whereby 2-carboxy-1,2'-dianthrimide of improved quality is obtained in increased yield.

Other objects of the invention in part will be obvious and in part will appear hereinafter.

These objects are accomplished, according to the present invention, by taking advantage of cerain properties which I have discovered are possessed by the potassium salt of 2-carboxy-1,2'-dianthrimide.

I have discovered that, when the alkali metal, ammonium and organic base salts of 2-carboxy-1,2'-dianthrimide are heated in aqueous solution for a substantial period of time, they are transformed to less soluble modifications, the velocity of transition from soluble form to less soluble form varying with the individual salts and being accelerated as the temperature rises. In general, the transformation is considerable at temperatures of about 70° C. and above, and is rapid at temperatures above 90° C. Consequently, when in the prior procedures an aqueous solution of the sodium salt of 2-carboxy-1,2'-dianthrimide was boiled, or heated above 90° C. during steam-distillation of the solvent, the sodium salt was rendered less soluble with the result that a considerable portion of it was discarded as part of the insoluble sludge.

I have discovered further that the potassium salt of 2-carboxy-1,2'-dianthrimide is the least sensitive of said salts to the insolubilizing effect of elevated temperatures upon its aqueous solutions, and that the solubility of the potassium salt in water is greater than that of the sodium, lithium, ammonium and organic base salts. For example, when 10 grams of pure 2-carboxy-1,2'-dianthrimide (free acid) are suspended in one liter of water at about 40° C. and 1.12 grams of sodium carbonate are added, the acid dissolves. On cooling the solution to 25° C., crystals of the sodium salt of the carboxy-dianthrimide precipitate. On warming the mixture to 80° to 90° C. the crystals dissolve, but after a relatively short time at said temperature (about 10 minutes) an insoluble precipitate forms which does not redissolve upon continued heating or upon dilution with water to 2 or 3 times the original volume. The potassium salt of 2-carboxy-1,2'-dianthrimide, produced in a similar manner, behaves quite differently. Thus, when 10 grams of pure 2-carboxy-1,2'-dianthrimide (free acid) are suspended in one liter of water at 80° to 90° C. and 1.5 grams of potassium carbonate are added, the acid dissolves. On cooling the solution to 25° C., crystals of the potassium salt of the carboxy-dianthrimide precipitate, but on warming the mixture to 80° to 90° C. the crystals dissolve and the solution shows only slight precipitation after being held for about 2 hours at said temperature. When the solution is heated to boiling, however, a substantial precipitation occurs and the precipitate does not redissolve upon continued heating or upon dilution with water to 2 to 3 times the original volume.

Accordingly, in the practice of the present invention, 2-carboxy-1,2'-dianthrimide is separated, in the form of an aqueous solution of its potassium salt, from insoluble impurities; and the temperature at which the potassium salt of the carboxy-dianthrimide in aqueous solution is maintained for a substantial period of time (more than 15 minutes) is limited to a maximum of 90° C.

In the practice of the present invention in accordance with a preferred method of procedure, crude 2-carboxy-1,2'-dianthrimide, containing insoluble impurities, is converted to an aqueous solution of the potassium salt of 2-carboxy-1,2'-dianthrimide, and the aqueous solution of said potassium salt is mechanically separated from other components of the crude carboxy-dianthrimide which are insoluble in said aqueous solution (for example, by filtration, centrifugation or sedimentation followed by decantation). From the time of formation of the aqueous solution of the potassium salt of 2-carboxy-1,2'-dianthrimide to the completion of the separation of said aqueous solution from insoluble impurities, the temperature at which said aqueous solution is held is limited to a maximum of 90° C. In general, the temperature may be permitted to rise above 90° C. for a short time, but it should not exceed 90° C. for more than 15 minutes. The 2-carboxy-1,2'-dianthrimide can then be recovered from the aqueous solution of its potassium salt in any suitable manner, e. g., by acidifying the solution with an acid which forms a water-soluble potassium salt (for example, sulfuric acid, hydrochloric acid, acetic acid, etc.), and filtering and washing the precipitate of free 2-carboxy-1,2'-dianthrimide.

The aqueous solution of the potassium salt of 2-carboxy-1,2'-dianthrimide can be formed in various ways. If the crude 2-carboxy-1,2'-dianthrimide is in the form of the free acid, it may be converted to the potassium salt by reacting with aqueous potassium hydroxide, potassium carbonate, or other potassium salt which reacts with 2-carboxy-1,2'-dianthrimide to form the potassium salt of the latter, preferably by heating at a temperature not exceeding 90° C. (and preferably between 70° and 90° C.) in the presence of sufficient water to dissolve the potassium dianthrimide-carboxylate, while agitating the mixture. The resulting solution they may be filtered to remove insoluble material which was present in the crude carboxy-dianthrimide and was carried over with it into the solution; the filter-cake may be washed with hot water (not exceeding 90° C.); and a purified 2-carboxy-1,2'-dianthrimide then may be recovered from the combined filtrate and washings by acidification in the manner described above.

For example, if the crude 2-carboxy-1,2'-dianthrimide has been obtained as the result of condensation of 2-aminoanthraquinone with 1-chloro-2-carboxy-anthraquinone (or 2-chloroanthraquinone with 1-amino-2-carboxy-anthraquinone) in the presence of a Friedel and Crafts condensing agent, the residual condensing agent may be first removed by acidification, followed by filtration of the insoluble crude carboxy-dianthrimide (free acid) from acid-soluble material, and, preferably after removal of water-soluble material by washing with water, the crude 2-carboxy-1,2'-dianthrimide may be converted to the potassium salt in the manner described above. Thus, a condensation reaction mixture produced by heating 2-amino-anthraquinone with 1-chloro-2-carboxy-anthraquinone and anhydrous aluminum chloride suspended in an inert organic liquid as the reaction medium, after being treated to remove the organic liquid (for example, by adding the condensation reaction mixture to water and making it slightly alkaline by addition of sodium carbonate or the like, followed by steam distillation), may be further treated to remove unreacted 2-amino-anthraquinone and aluminum compounds from 2-carboxy-1,2'-dianthrimide produced by the condensation (for example, by acidifying the remaining aqueous mass, for instance with mineral acid, boiling the acid mixture for several hours, filtering, and washing the filter-cake with water), and the resulting crude 2-carboxy-1,2'-dianthrimide then may be converted to an aqueous solution of its potassium salt; for instance by heating it in aqueous suspension with potassium hydroxide, potassium carbonate, potassium acetate or other potassium compound capable of forming the potassium salt of 2-carboxy-1,2'-dianthrimide, at a temperature not higher than 90° C., and preferably between 70° and 90° C. The resulting solution then may be filtered to remove insoluble material which was present in the crude carboxy-dianthrimide and was carried over with it into the solution; the filter-cake may be washed with hot water (not exceeding 90° C.); and a purified 2-carboxy-1,2'-dianthrimide then may be recovered from the combined filtrate and washings by acidification in the manner described above.

In some cases, the washed filter-cake of insoluble impurities may contain occluded potassium salt of 2-carboxy-1,2'-dianthrimide and/or free 2-carboxy-1,2'-dianthrimide formed by hydrolysis of the potassium salt. (2-carboxy-1,2'-dianthrimide is a weak acid and its potassium salt tends to hydrolyze in aqueous solution.) If said filter-cake contains a substantial amount of 2-carboxy- 1,2'-dianthrimide in said forms, it may be advantageously subjected to a repetition of the treatment for the purpose of recovering the additional carboxy-dianthrimide present therein.

If the crude 2-carboxy-1,2'-dianthrimide is in the form of a salt, it is preferably first converted to the free acid by acidifying; then, preferably after removal of acid-soluble material by filtration and preferably also washing with water, it may be converted to the potassium salt in the manner described above. For example, if the crude 2-carboxy-1,2'-dianthrimide has been obtained as the result of the use of sodium carbonate or other acid-binding agent in the condensation, and the carboxy-dianthrimide is therefore in the form of its sodium or other salt derived from the acid-binding agent, it may be acidified to convert it to the free-acid form, and, preferably after removal of acid-soluble material by filtration and washing with water, it may be converted to the potassium salt in the manner described above.

The invention will be illustrated by the following specific examples in which the parts are by weight and temperatures are in degrees centigrade.

Example 1

Part A.—A mixture of 350 parts of technical orthodichlorobenzene, 38 parts of 2-aminoanthraquinone, 49 parts of 1-chloro-2-carboxy-anthraquinone and 13 parts of anhydrous aluminum chloride was heated and maintained under reflux at its boiling temperature (between 175° and 180°) for about 17 hours, to complete formation of 2-carboxy-1,2'-dianthrimide. The dichlorobenzene was removed by running the mass into 1000 parts of water containing sufficient sodium carbonate in solution to render the resulting mixture slightly alkaline (30 parts of soda ash) and then steam-distilling the mixture. Two parts of a higher alkyl benzene sulfonate product of the type produced in Example 1 of United States Letters Patent 2,387,572 were added to the batch, to wet and disperse the sludge particles, and the whole was diluted with 8000 parts of water and made acid to Congo red by addition of sulfuric acid (50 parts of 60° Bé. sulfuric acid). The acid mixture was boiled for 2 to 4 hours and then filtered; and the filter-cake of crude 2-carboxy-1,2'-dianthrimide was washed acid-free with water. Besides 2-carboxy-1,2'-dianthrimide, it comprised unreacted 1-chloro-2-carboxy-anthraquinone, residual 2-amino-anthraquinone, insoluble by-products of the condensation, and possibly decarboxylation products, such as 1,2'-dianthrimide. The well-drained filter-cake (which weighed about 372 parts and contained 22.2% organic solids) was slurried in 2000 parts of water containing in solution 3 parts of "Tamol NNO" dispersing agent (a naphthalene sulfonic acid-formaldehyde condensation product); the slurry was heated to about 75°; and, at that temperature, 26 parts of potassium carbonate were added (sufficient to make the aqueous slurry permanently alkaline). The aqueous alkaline mass was agitated for half an hour at 70° to 75°, to dissolve the 2-carboxy-1,2'-dianthrimide in the form of its potassium salt, and then was filtered. The filter-cake was washed with hot (70°) water until the washings were but lightly colored. (The potassium salt of 2-carboxy-1,2'-dianthrimide yields a deep-red solution.) The washings were added to the filtrate. Owing to the fact that the washed filter-cake contained a considerable amount of 2-carboxy-1,2'-dianthrimide, formed by hydrolysis of the potassium salt during the washing of the filter-cake and/or occluded in the precipitate as free acid or as salt, it was held for a second extraction treatment, described in part C.

Part B.—The combined filtrate and washings, containing the potassium salts of 2-carboxy-1,2'-dianthrimide and residual 1-chloro-2-carboxy-anthraquinone, was cooled to 50° to 60°, and sulfuric acid was slowly added to it with care. 2-carboxy-1,2'-dianthrimide (free acid) precipitated in the form of small red particles. The addition of acid was discontinued when a spot of the mixture on white filter-paper showed a faintly colored run-out, indicating that precipitation of the carboxy-dianthrimide (free acid) was substantially complete. At this stage, 1-chloro-2-carboxy-anthraquinone (free acid), simultaneously formed from its potassium salt present as an impurity in the carboxy-dianthrimide potassium salt, remained largely in solution, owing to its greater solubility. The aqueous mass was then filtered, and the filter-cake of carboxy-dianthrimide was washed with warm water (40°) until a sample of the wash-water, on being strongly acidified with sulfuric acid, yielded no precipitate. (Washing removes mother liquor and any 1-chloro-2-carboxy-anthraquinone which may have precipitated with the carboxy-dianthrimide.) The washed filter-cake of 2-carboxy-1,2'-dianthrimide was dried.

Part C.—The washed filter-cake obtained in part A was suspended in 5000 parts of water, the suspension was acidified with sulfuric acid and boiled to convert carboxy-dianthrimide salt to the free acid form, and the aqueous mass was filtered. The filter-cake of precipitated free acid was washed acid-free with water and suspended in 2000 parts of water. The suspension was heated to about 75° and 26 parts of potassium carbonate were added. The alkaline mass was agitated at about 75° for half an hour and then filtered, and the filter-cake was washed with warm (40°) water. The filtrate and washings were combined. The resulting solution was carefully acidified with sulfuric acid until the 2-carboxy-1,2'-dianthrimide was precipitated, the mass was filtered, and the filter-cake was washed with warm water, all as described in part B above. The resulting filter-cake of 2-carboxy-1,2'-dianthrimide was dried.

A somewhat lower yield of 2-carboxy-1,2'-dianthrimide was obtained by omitting the preliminary acidification of the washed filter-cake obtained in part A; that is, by suspending it in 2000 parts of water and treating with potassium carbonate in the manner described in part C.

Example 2

A mixture of 3500 parts of technical orthodichlorobenzene, 380 parts of 2-aminoanthraquinone, 490 parts of 1-chloro-2-carboxy-anthraquinone and 135 parts of anhydrous aluminum chloride was heated and maintained under reflux at its boiling temperature (between 175° and 180°) for about 17 hours to complete formation of 2-carboxy-1,2'-dianthrimide. The reaction mixture was run into about three times its weight of water containing sufficient sodium carbonate in solution to render the resulting mixture slightly alkaline; and the resulting mass was steam-distilled to remove the dichlorobenzene. The mass was made acid to Congo red by addition of sulfuric acid. The acid mixture was boiled for 2 to 4 hours and then filtered, and the filter-cake of crude 2-carboxy-1,2'-dianthrimide was washed acid-free with water. Portions of the resulting filter-cake were treated to recover a purified 2-carboxy-1,2'-dianthrimide in the following manner:

Part A.—72 parts of the filter-cake obtained above, corresponding to 9.0 parts of 1-chloro-2-carboxy-anthraquinone initially charged, were suspended in 1000 parts of hot water (70° to 80°) and to the suspension 3.5 parts of potassium hydroxide and a small amount of "Tamol NNO" dispersing agent were added. The mixture was heated and agitated at 70° to 80° for a half-hour to dissolve the 2-carboxy-1,2'-dianthrimide in the form of its potassium salt, and then was filtered. The filter-cake was washed with hot (70°) water until the washings were only slightly colored. The combined filtrate and washings, corresponding to a volume of 1500 parts of water, was cooled to 50° to 60°, and sulfuric acid was added to precipitate the carboxy-dianthrimide (free acid). The aqueous mass was then filtered, and the filter-cake of carboxy-dianthrimide was washed with warm water (40°) until the washings gave no precipitate when strongly acidified with sulfuric acid. The washed filter-cake was dried.

Part B.—72 parts of the filter-cake obtained above, corresponding to 9.0 parts of 1-chloro-2-carboxy-anthraquinone initially charged, were suspended in 1000 parts of hot water (70° to 80°). To the resulting suspension were added 4.7 parts of potassium carbonate and a small amount of "Tamol NNO" dispersing agent. The mixture was heated and agitated at 70° to 80° for a half hour, and then was filtered. The filter-cake was washed with hot (70°) water until the washings were only weakly colored. The combined filtrate and washings, corresponding to a volume of 1750 parts of water, was cooled to 50° to 60° and acidified with sulfuric acid to precipitate the carboxy-dianthrimide (free acid). The aqueous mass was then filtered, and the filter-cake of carboxy-dianthrimide was washed with warm water (40°) until the washings gave no precipitate when made strongly acid with sulfuric acid. The washed filter-cake was dried.

Example 3

Part A.—A mixture of 600 parts of trichlorobenzene, 53.2 parts of 2-amino-anthraquinone, 68.3 parts of 1-chloro-2-carboxy-anthraquinone and 24.5 parts of sodium carbonate was heated to boiling, and refluxed (218° to 220°) for 24 hours. The reaction mass was cooled to 40°, diluted with 120 parts of benzene, and filtered. The filter-cake was washed with 240 parts of benzene, and dried. The resulting crude sodium 1,2'-dianthrimide-2-carboxylate was ground to a fine powder.

Part B.—40 parts of the crude product obtained in part A of this example were suspended in 2000 parts of water. The suspension was made strongly acid to Congo red and boiled 15 minutes. The mass was cooled, diluted to a volume corresponding to 4000 parts of water, and filtered. The filter-cake was washed acid-free. The filter-cake was slurried in 2000 parts of hot water (70°), and 11 parts of potassium carbonate were added. The resulting aqueous alkaline mixture was agitated at 70° to 75° for half an hour, and then it was filtered on a filter coated with "Supercel." The filter-cake was washed with hot water (60° to 70°) until a colorless filtrate was obtained. The filtrate and washings were combined, and dilute sulfuric acid was added at 50° until no further red precipitate (of 2-carboxy-1,2'-dianthrimide free acid) was obtained. The mass was filtered, and the filter-cake was washed with warm water (40° to 45°) until the washings gave no precipitate when strongly acidified with sulfuric acid. The washed filter-cake was dried.

Example 4

Part A.—A mixture of 600 parts of trichlorobenzene, 53.2 parts of 2-aminoanthraquinone, 68.3 parts of 1-chloro-2-carboxy-anthraquinone, and 31.2 parts of potassium carbonate was heated to boiling, and refluxed (218° to 220°) for 24 hours. The reaction mass was cooled to 40°, diluted with 160 parts of benzene, and filtered. The filter-cake was washed with 320 parts of benzene, and dried. The resulting crude potassium 1,2'-dianthrimide-2-carboxylate, which was a very crystalline product, was ground to a powder.

Part B.—A 35 part portion of the crude product obtained in Part A of this example, were agitated for half an hour with a solution of 11 parts of potassium carbonate in 2000 parts of water at 70° to 75°. The mass was then filtered on a filter coated with "Supercel," and the filter-cake was washed with hot water (60° to 70°) until a colorless filtrate was obtained. The filtrate and washings were combined and acidified with sulfuric acid at 50° until the 2-carboxy-1,2'-dianthrimide was completely precipitated; the resulting mass was filtered; and the filter-cake was washed with warm water and dried, as described in Example 3, part B. A yield of only 2.8 parts of 2-carboxy-1,2'-dianthrimide was thus obtained.

Part C.—Another 35 part portion of the crude product obtained in part A of this example were suspended in 2000 parts of hot water. The suspension was made strongly acid to Congo red with sulfuric acid, and boiled for 15 minutes. The mass was cooled to room temperature and filtered, and the filter-cake was washed acid-free. The filter-cake was agitated with a solution of 11 parts of potassium carbonate for half an hour at 70° to 75°. The mass was then filtered on a filter coated with "Supercel" and the filter-cake was washed until a colorless filtrate was obtained.

Part D.—The filtrate and washings were combined, acidified with sulfuric acid to precipitate the carboxy-dianthrimide free acid, and the latter was recovered by filtration, and washed and dried as in part B of this example. A yield of 14 parts of 2-carboxy-1,2'-dianthrimide was thus obtained.

Part E.—The washed filter-cake obtained in part C of this example was acidified with sulfuric acid, filtered, washed, and treated with potassium carbonate; the resulting solution was filtered; the filtrate was acidified with sulfuric acid; and the resulting carboxy-dianthrimide was recovered by filtration and washed and dried, all as in parts C and D of this example. An additional 5.5 parts of 2-carboxy-1,2'-dianthrimide were thus obtained.

It will be evident to those skilled in the art that the invention is not limited to details of the foregoing examples and that changes may be made without departing from the scope of the invention.

Thus the invention is not limited to the use of potassium compounds employed in the above examples to convert the 2-carboxy-1,2'-dianthrimide to its potassium salt; but other compounds of potassium which react with 2-carboxy-1,2'-dianthrimide to form the potassium salt of the latter may be employed; as for example, potassium bicarbonate, potassium acetate, potassium sulfite, etc.

The process of the present invention is not limited to the recovery and/or purification of 2-carboxy-1,2'-dianthrimide resulting from the condensation of 2-amino-anthraquinone with 1-chloro-2-carboxy-anthraquinone, but it can be employed for the recovery of 2-carboxy-1,2'-dianthrimide obtained in other ways, for example, by the condensation of 2-chloro-anthraquinone with 1-amino-2-carboxy-anthraquinone.

Further, the invention is not limited to the recovery and/or purification of 2-carboxy-1,2'-dianthrimide obtained by condensation of 2-amino-anthraquinone with 1-chloro-2-carboxy-anthraquinone with the aid of aluminum chloride as a condensing agent or obtained by carrying out the condensation in the presence of an acid-binding agent without a catalyst, but includes the treatment of crude 2-carboxy-1,2'-dianthrimide obtained with the aid of other Friedel and Crafts condensing agents (such as, anhydrous zinc chloride or ferric chloride) or obtained by carrying out the condensation in the presence of an acid-binding agent with a copper catalyst.

I claim:

1. The method of separating 2-carboxy-1,2'-dianthrimide from insoluble impurities which comprises forming an aqueous solution of the potassium salt of the carboxy-dianthrimide, separating the aqueous solution of the potassium salt of the carboxy-dianthrimide from insoluble impurities, and limiting the time during which aqueous solution of said potassium salt is at a temperature above 90° C. to a maximum period of 15 minutes, until completion of the separation.

2. The method of recovering 2-carboxy-1,2'-dianthrimide from a mixture containing it together with insoluble impurities which comprises forming an aqueous solution of the potassium salt of the carboxy-dianthrimide and separating the aqueous solution of the potassium salt of the carboxy-dianthrimide from insoluble impurities, while limiting the temperature to a maximum of 90° C.

3. The method of recovering 2-carboxy-1,2'-dianthrimide from a mixture containing it in the free acid form together with insoluble impurities which comprises converting the carboxy-dianthrimide to an aqueous solution of its potassium salt, separating the aqueous solution of the potassium salt of the carboxy-dianthrimide from insoluble impurities, and limiting the time during which aqueous solution of said potassium salt is at a temperature above 90° C. to a maximum period of 15 minutes, until completion of the separation.

4. The method of recovering 2-carboxy-1,2'-dianthrimide from a crude 2-carboxy-1,2'-dianthrimide resulting from the condensation of 2-amino-anthraquinone with 1-chloro-2-carboxy-anthraquinone which comprises separating 2-carboxy-1,2'-dianthrimide in the form of an aqueous solution of its potassium salt from other components of the crude carboxy-dianthrimide which are insoluble in said aqueous solution, and limiting the temperature at which the potassium salt in aqueous solution is held for a period of time greater than 15 minutes to a maximum of 90° C., until completion of the separation.

5. The method of recovering 2-carboxy-1,2'-dianthrimide from a crude 2-carboxy-1,2'-dianthrimide resulting from the condensation of 2-amino-anthraquinone with 1-chloro-2-carboxy-anthraquinone which comprises forming an aqueous solution of the potassium salt of the carboxy-dianthrimide, separating the aqueous solution of the potassium salt of the carboxy-dianthrimide from other components of the crude carboxy-dianthrimide which are insoluble in said aqueous solution, and limiting the temperature at which the potassium salt in aqueous solution is held for a period of time greater than 15 minutes to a maximum of 90° C., until completion of the separation.

6. The method of recovering 2-carboxy-1,2'-dianthrimide from a condensation product resulting from the condensation of 2-amino-anthraquinone with 1-chloro-2-carboxy-anthraquinone with the aid of aluminum chloride which comprises converting the 2-carboxy-1,2'-dianthrimide to its potassium salt, forming an aqueous solution of said potassium salt, separating said aqueous solution from other components of the crude carboxy-dianthrimide which are insoluble in said aqueous solution, and limiting the temperature at which the potassium salt in aqueous solution is held for a period of time greater than 15 minutes to a maximum of 90° C. until completion of the separation.

7. The method of recovering 2-carboxy-1,2'-dianthrimide from a condensation product resulting from the condensation of 2-amino-anthraquinone with 1-chloro-2-carboxy-anthraquinone which comprises recovering a crude 2-carboxy-1,2'-dianthrimide in the free acid form from the condensation product, converting the 2-carboxy-1,2'-dianthrimide to its potassium salt, forming an aqueous solution of said potassium salt, separating said aqueous solution from other components of the crude carboxy-dianthrimide which are insoluble in said aqueous solution, and limiting the time during which aqueous solution of said potassium salt is at a temperature above 90° C. to a maximum period of 15 minutes, until completion of the separation.

8. The method of separating 2-carboxy-1,2'-dianthrimide from insoluble impurities present therewith in a crude 2-carboxy-1,2'-dianthrimide which comprises treating the crude carboxy-dianthrimide in the free acid form with aqueous potassium carbonate to form an aqueous solution of the potassium salt of the carboxy-dianthrimide, separating said aqueous solution from other components of the crude carboxy-dianthrimide which are insoluble in said aqueous solution, and limiting the temperature at which said potassium salt in aqueous solution is held for a period of time greater than 15 minutes to a maximum of 90° C., until completion of the separation.

9. The method of recovering 2-carboxy-1,2'-dianthrimide from a crude 2-carboxy-1,2'-dianthrimide in the free acid form, obtained from a condensation product resulting from the condensation of 2-amino-anthraquinone with 1-chloro-2-carboxy-anthraquinone with the aid of aluminum chloride, which comprises treating the crude carboxy-dianthrimide with aqueous potassium carbonate to form an aqueous solution of the potassium salt of the carboxy-dianthrimide, separating said aqueous solution from other components of the crude carboxy-dianthrimide which are insoluble in said aqueous solution, and limiting the time during which aqueous solution of said potassium salt is at a temperature above 90° C. to a maximum period of 15 minutes, until completion of the separation.

MAURICE H. FLEYSHER.

No references cited.